(12) United States Patent
Deptolla

(10) Patent No.: US 6,547,329 B2
(45) Date of Patent: Apr. 15, 2003

(54) DEVICE FOR SECURING OBJECT ON MOTOR VEHICLE SEAT HAVING SECUREMENTS FORMED BY ARTICULATED ELEMENTS

(75) Inventor: Bernd Deptolla, Niedernwohren (DE)

(73) Assignee: Bertrand Fauer Sitztechnik GnbH & Co. KG, Stadthagen (DE)

( * ) Notice: Subject to any disclaimer, the term of this patent is extended or adjusted under 35 U.S.C. 154(b) by 0 days.

(21) Appl. No.: 09/909,201

(22) Filed: Jul. 19, 2001

(65) Prior Publication Data

US 2002/0008416 A1 Jan. 24, 2002

(30) Foreign Application Priority Data

Jul. 22, 2000 (DE) .......................................... 100 35 777

(51) Int. Cl.$^7$ ................................................. B60N 2/28
(52) U.S. Cl. ..................................... 297/253; 297/250.1
(58) Field of Search .............................. 297/250.1, 253, 297/216.11; 296/64

(56) References Cited

U.S. PATENT DOCUMENTS 5,918,934 A    7/1999  Siegrist ................... 297/250.1
5,941,601 A  * 8/1999  Scott et al. ............... 297/250.1
6,354,648 B1 * 3/2002  Allan et al. .................. 297/253
6,390,560 B1 * 5/2002  Gandhi et al. .............. 297/253

FOREIGN PATENT DOCUMENTS

DE    19650087 C1    12/1997
DE    19738802 C1    10/1998

* cited by examiner

Primary Examiner—Peter R. Brown
(74) Attorney, Agent, or Firm—Flanagan & Flanagan; John R. Flanagan

(57) ABSTRACT

A device for detachably securing an object on a motor vehicle seat includes a transverse support member mountable adjacent to and along a gap between a seating surface and backrest of the motor vehicle seat and a pair of securements spaced apart and mounted to the support member so as to extend into the gap and being adapted for securing the object on the seating surface. Each securement includes a set of elements and structures connecting at least some of the elements of each set with one another and with the support member such that the securements are swivellable in planes defined by the securements relative to the support member between extended positions of use and retracted positions of rest. In positions of use, the securements have U-shaped configurations formed by the sets of elements such that one securement is identical to and a mirror image of the other securement.

15 Claims, 5 Drawing Sheets

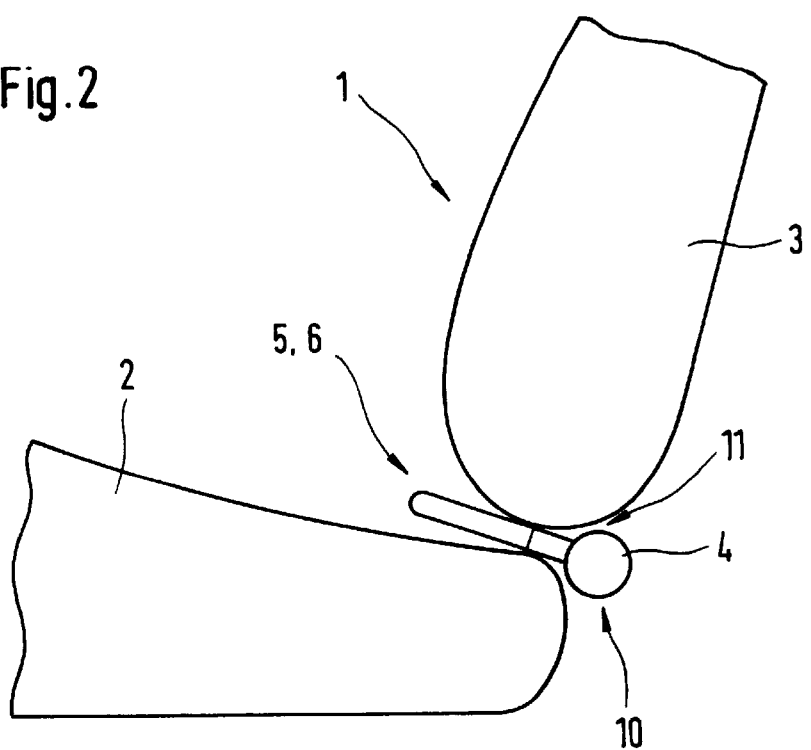
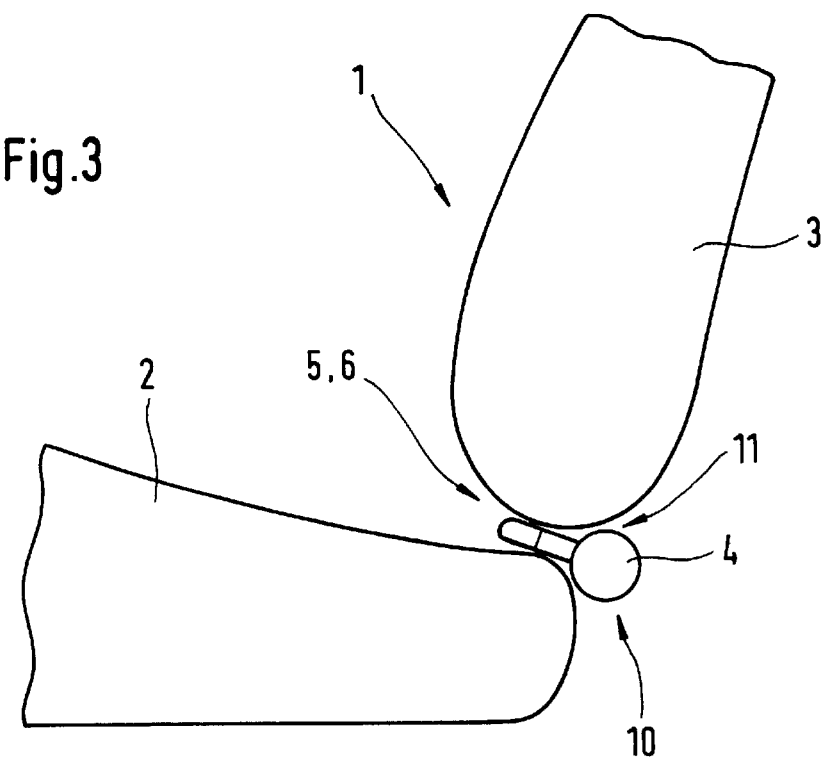

DEVICE FOR SECURING OBJECT ON MOTOR VEHICLE SEAT HAVING SECUREMENTS FORMED BY ARTICULATED ELEMENTS

BACKGROUND OF THE INVENTION

1. Field of the Invention

The present invention relates to a device for securing objects, such as a child's safety seat, on a motor vehicle seat and, more particularly, is concerned with such device having securements formed by articulated elements which facilitate extending and retracting the securements from and into a gap between a seating surface and backrest of the motor vehicle seat.

2. Description of the Prior Art

In German patent document No. DE 196 50 087 C1, a device is disclosed for securing objects, in particular a child's safety seat. This device comprises two U-shaped securements spaced apart from one another, which in their position of use project between the seat cushion and backrest of a motor vehicle seat in the direction of travel. By means of securement parts, the securements are simultaneously attached on a swivel axle and on a reinforcement tube. In the position of use of the device, the ends of the reinforcement tube rest in rigid stops, which are a component part of a bearing bracket of the motor vehicle seat. Thus, in event of a crash, the requisite strength is provided for the tensile forces on the securements. If, however, the use of the securements is not required, the securements can then be brought into a rest position on the backside of the motor vehicle seat by swivelling the device rearward to the backside.

In German patent document No. 197 38 802 C1, another device is disclosed for securing a child's safety seat. This device comprises securements disposed on a cross bar positioned on the backside of the motor vehicle seat. The securements are swivellable about a vertical axis and can, if needed, be moved between the seating surface and backrest of the motor vehicle seat. The swivel motion of the securements is accomplished by a prestressed spring. The securements are held in a resting position by means of a blockage.

In U.S. Pat. No. 5,918,934, still another device is disclosed for securing a child's safety seat. This device comprises a cross rod disposed on the backside of the motor vehicle seat and bent at right angles so as to form U-shaped securements that project into the gap between the seating surface and backrest of the seat. The cross rod is rotatably supported at its opposite ends in lateral portions of the motor vehicle seat. The securements are for securing the child's safety seat to the cross rod. In a preferred implementation of this device, the securements are disposed in the direction of the seating surface and swivellable about a horizontal axis. The cross rod being bent at right angles has a disadvantage in that due to its shape it cannot have a high flexural rigidity. This must be compensated for by the rod having a greater diameter.

What the aforementioned devices have in common is that their securements for securing a child's safety seat are required to be present in the gap between the seating surface and backrest of the motor vehicle seat. If, however, this seating surface is utilized by a person without a child's safety seat, the securements in the rearward region of the seating surface are considered to be disturbing to the comfort of the seating surface. For that reason, these securements, if necessary, must be removed from this seating region. The constructions of these devices, however, are complicated and thus expensive. In addition, these devices occupy a relatively large space behind or under the motor vehicle seat.

Consequently, a need exists for innovation in a child's safety seat securement device that will solve the aforementioned problems without introducing new problems in place thereof. SUMMARY OF THE INVENTION The present invention provides a device for securing a child's safety seat which solves the aforementioned problems. The device of the present invention includes readily accessible securements for the mounting of a child's safety seat or the like. The securements also are removable in a simple manner from the seating region so as to avoid impairment of the comfort of the seating surface. In addition, the device is cost-effective and space saving. The securements are not rigid U-shaped members. Instead, they are U-shaped members comprised of sets of individual elements connected with one another via articulations such that the elements are swivellable in planes defined by the securements. This has the advantage that the fixed extensions provided heretofore in the plane of the securements are nullified. In the device of the present invention, if the ends of the U-shaped members are moved away from one another or if the U-shaped members are converted into a parallelogram by swivelling, the extension of each securement is reduced in the direction of the seating surface. Through this effect the securements can completely disappear between the nonusable portion of the seating surface and the lower end of the backrest.

The device of the present invention also includes a rigid support member in the form of an elongated rod or tube to which the ends of the U-shaped members are articulately connected. The rod extends transversely to the longitudinal direction of the motor vehicle on the lower backside of the backrest and is rigidly integrated into the support structure of the seat. The rod has the advantage that it is cost-effective and highly space-saving and thus does not hinder, for example, the foot room of a back seating row. If, by means of a simple driving means, at least one securement (for example for anchoring a safety seat belt) is actuated, this securement can readily be moved out of the gap between the seating surface and backrest.

Accordingly, the present invention is directed to a device for detachably securing an object, such as a child's safety seat, on a motor vehicle seat. The device comprises: (a) a transverse support member mountable adjacent to and along a gap between a seating surface and backrest of a seat of a motor vehicle; and (b) a pair of securements spaced apart and mounted to the support member so as to extend in the gap and being adapted for securing the object on the seating surface. Each of the securements includes a set of elements and means for connecting at least some of the elements of each set with one another and with the support member such that some elements of the securements are swivellable in planes defined by the securements relative to the support member between positions of use in which the securements are extended away from the support member and the gap and positions of rest in which the securements are retracted toward the support member and into the gap. The securements in the positions of use have respective U-shaped configurations formed by the sets of elements such that one of the securement is substantially identical to and arranged as a mirror image of the other of the securements.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made the attached drawings in which:

FIG. 2 is a diagrammatic side elevational view of the motor vehicle seat with securements of the device being disposed in a position of use.

FIG. 3 is a diagrammatic side elevational view of the motor vehicle seat with securements of the device being disposed in a position of rest or non-use.

DETAILED DESCRIPTION OF THE INVENTION

Figure 1:
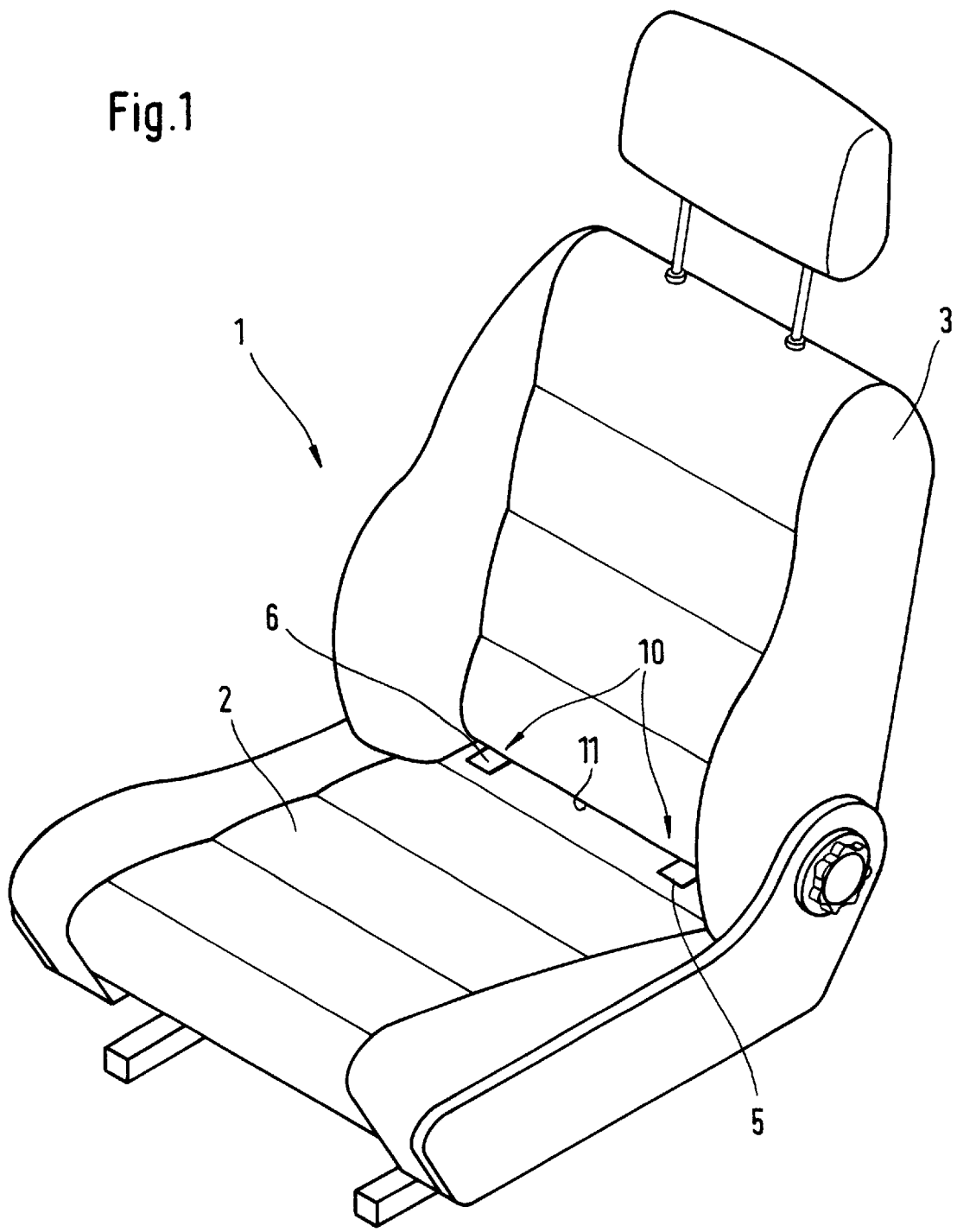
FIG. 1 is a perspective representation of a motor vehicle seat for employing a device for securing a child's safety seat or the like according to the invention.

Referring to the drawings and particularly to FIGS. 1–3, there is illustrated a motor vehicle seat, generally designated 1, employing a device, generally designated 10, of the present invention having a support member 4 and a pair of securements 5, 6 mounted thereto and to which can be latched a child's safety seat or another object (not shown) for securing the same on the seat 1. The securements 5, 6 extend forwardly from the support element 4 and are disposed in a gap 11 between a seating surface 2 and a backrest 3 of the seat 1. If a child's safety seat is used, then, according to standard, two securements must be available at a defined spacing from one another. The support member 4, as seen in FIGS. 2 and 3 but not in FIG. 1, is preferably in the form of an elongated rigid solid rod or hollow tube disposed behind the gap 11 and seating surface 2 and below the backrest 3. In the event of a crash or sudden braking the delay force, resulting from the objects or persons to be safeguarded, is introduced via the securements 5, 6 into the support member 4. From the support member 4 these forces are introduced via the opposite side contours 7a, 7b (FIGS. 4–9) of the frame of the motor vehicle seat 1 into the motor vehicle chassis. With respect to the different embodiments shown in FIGS. 4–9, it should be noted that, by way of example only, the support member 4 is connected with the side contours 7a, 7b of the seat frame. These connections can be provided such that they are fixed or detachable.

In FIGS. 2 and 3, the motor vehicle seat 1 is shown in a side view. In FIG. 2 the securements 5, 6 are shown in their position of use. They project forwardly from the gap 11 between the seating surface 2 and backrest 3 sufficiently far that a child's safety seat or the like can be readily latched onto the securements 5, 6. In FIG. 3 the securements 5, 6 are shown in their position of rest. It is clearly evident that the comfort of a seated person on the seating surface 2 would not be impaired by the securements 5, 6 in their position of rest. In FIGS. 2 and 3, it is also clearly evident that the support member 4 does not in any way restrict the foot region behind the seat 1 of a rear seat row. Suitcase storage space located behind the seat 1 is also not reduced by the presence of support element 4.

Figure 4:
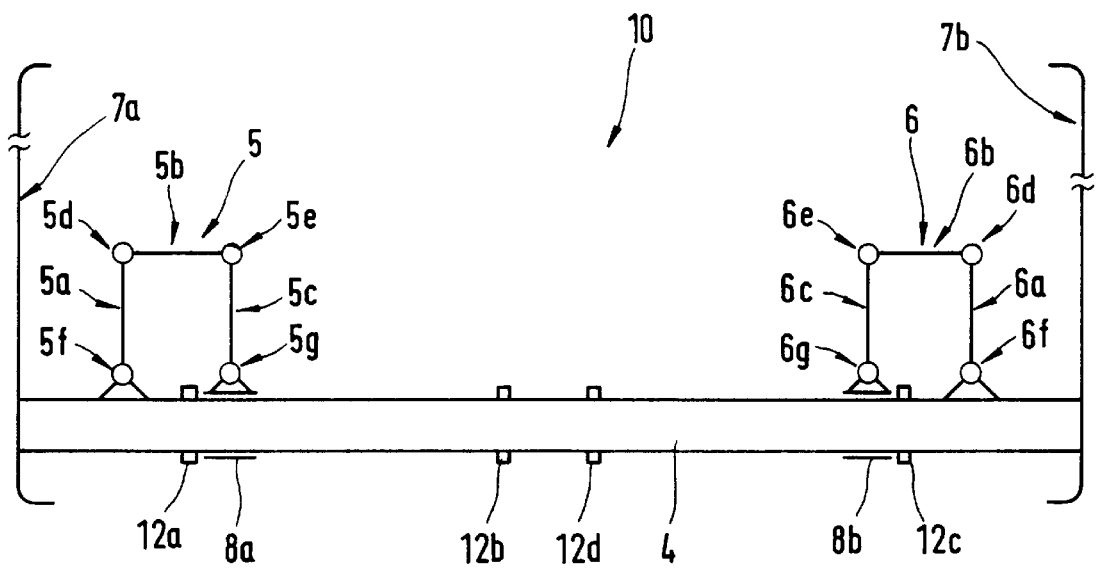
FIG. 4 is a schematic top view of a first embodiment of the device with the securements shown in the position of use.
Figure 5:
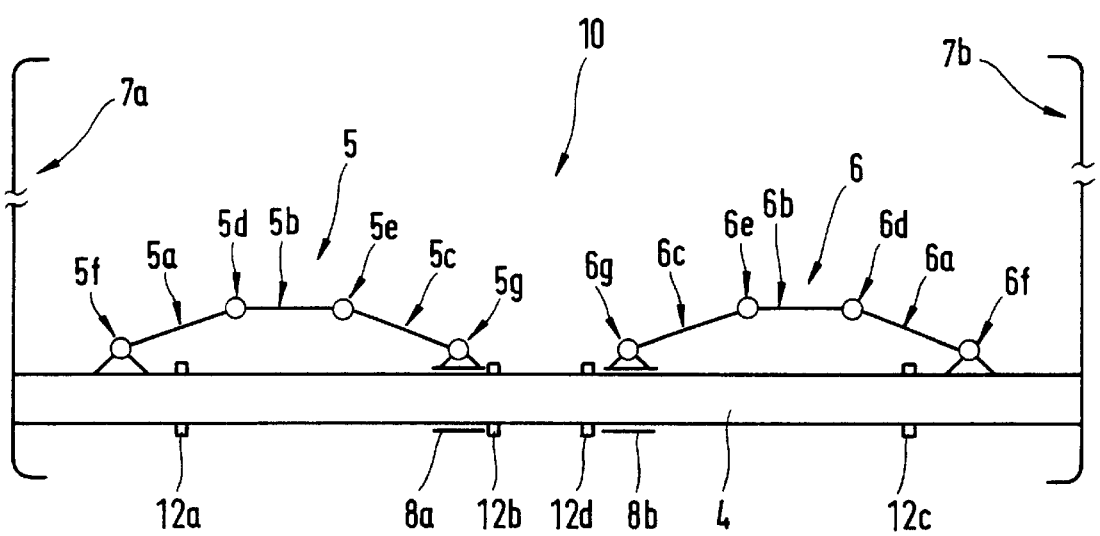
FIG. 5 is a view according to FIG. 4 with the securements show in the position of rest.

FIGS. 4 and 5 schematically show a first embodiment of the device 10 of the present invention. Securements 5 and 6 are respectively comprised of sets of elements 5a, 5b, 5c and 6a, 6b, 6c with the respective elements of each set being pivotally connected one with the other via articulations 5d, 5e and 6d, 6e. Articulations 5f and 6f respectively pivotally connect elements 5a and 6a of securements 5 and 6 at separate stationary locations on the support member 4. Articulations 5g and 6g respectively pivotally connect elements 5c and 6c of securements 5 and 6 to respective slide elements 8a and 8b which can slide along the support member 4 between respective pairs of stops 12a, 12b and 12c, 12d which are stationarily fastened on the support member 4 at axially spaced positions therealong. Preferably, the securements 5 and 6 in their positions of use have respective U-shaped configurations formed by sets of the elements 5a–5c and 6a–6c which are comprised of pairs of opposite shanks 5a, 5c and 6a, 6c extending generally parallel to one another and middle webs 5b and 6b extending between and perpendicular to the shanks 5a, 5c and 6a, 6c, articulations 5d, 5e and 6d, 6e connecting the shanks 5a, 5c and 6a, 6c with the webs 5b and 6b, and articulations 5f, 5g and 6f, 6g directly or indirectly connecting the shanks to the support member 4 such that the elements are swivellable in planes defined by the securements 5 and 6. Also, the securement 6 has a construction identical to and arranged as a mirror image of the construction of the securement 5.

In the positions of use of the securements 5 and 6 shown in FIG. 4, the slide elements 8a and 8b respectively rest in contact with stops 12a and 12c. Articulations 5d, 5e, 5f, 5g essentially form the corner points of a rectangular. In order for the securements 5 and 6 not to assume the form of parallelograms respectively inclined, for example, to the left and right in FIG. 4, and thus to make it difficult, if not impossible, for the application corresponding securements thereto, either on the respective articulations 5f and 6f limitations to the swivelling of elements 5a and 6a relative thereto can be provided or the articulations 5d and 6d can require internal stops which do not allow respective elements 5a, 5b and 6a, 6b of securements 5 and 6 to pivot relative to one another further than ninety degrees.

If the securements 5 and 6 are to be brought into the respective positions of rest shown in FIG. 5, the slide elements 8a and 8b must be moved toward one another and toward and adjacent to the stops 12b and 12d. It is advantageous that, in their respective positions of rest, the sets of elements of the respective securements 5 and 6 do not assume an approximately flat continuous line so as to avoid potential blocking of the return of the securements 5 and 6 to their positions of use or to avoid the requirement for application of high forces to the securements 5 and 6 to cause them to return to their positions of use. The conversion of the sets of elements of the securements 5 and 6 into a flat continuous line can be prevented by the respective articulations being internally limited with respect to their swivel angles such that the sets of elements can only convert into the curved configurations shown in FIG. 5.

In an alterative implementation of the first embodiment of the device 10 of FIGS. 4 and 5, the slide elements 8a and 8b can be disposed in the interior of the support member 4. In this implementation, slits or cutouts would be provided along the support member 4 between the locations of stops 12a, 12b and 12c, 12d to allow the connection of respective articulations 5g and 6g of securements 5 and 6 to the slide elements 8a and 8b. This interior disposition has the advantage that the opposite ends of the slits or cutouts would inherently serve as stops such that stops 12a, 12b and 12c, 12d would be eliminated and thus no external stops nor sleeve-shaped slide elements would be present projecting from the exterior of the support member 4 into the interior of the motor vehicle. In addition, this interior disposition would mean that any required lubrication means would be in the interior of the support member 4 and thus be prevented from soiling clothing or upholstery.

As a further alternative implementation of the first embodiment of FIGS. 4 and 5, it is possible that articulations 5d and 6d of securements 5 and 6 could be provided as rigid right angles. Then, overall each securement 5 and 6 would only have three articulations. Since elements 5a, 5c and 6a, 6c are in general longer than element 5b and 6b, the rigid angles at 5d and 6d would not particularly extend out in the direction of the seating surface 2. The limitation of the swivel angles of the articulations 5d, 5f and 6d, 6f could moreover also be omitted.

Figure 6:
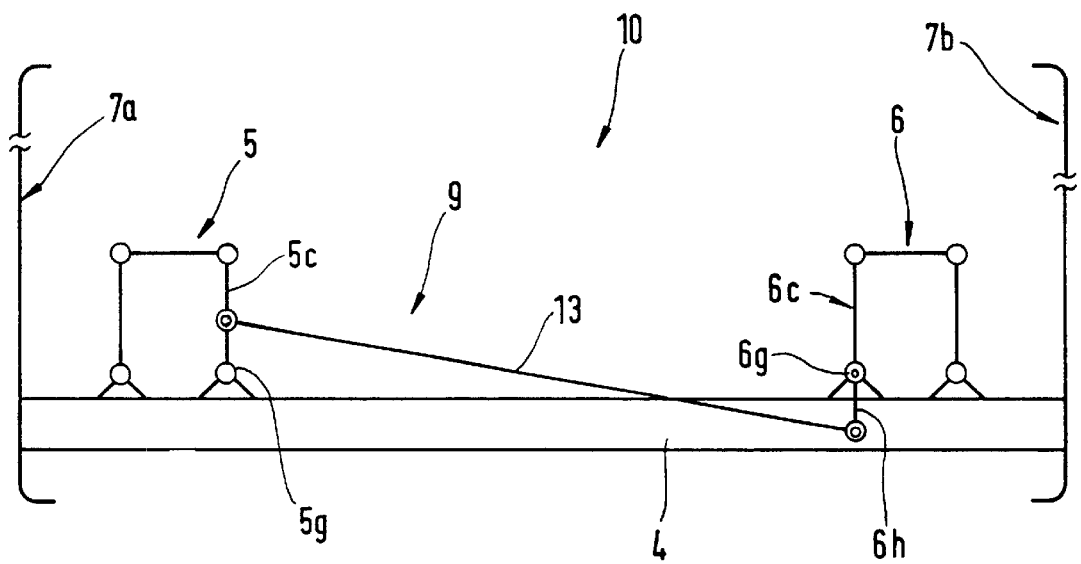
FIG. 6 is a schematic top view of a second embodiment of the device with the securements shown in the position of use.
Figure 7:
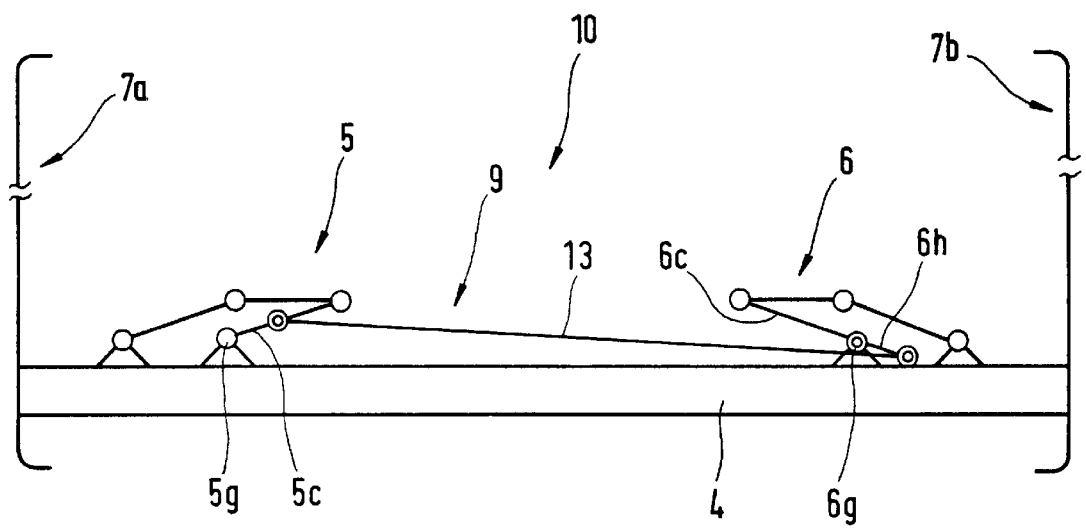
FIG. 7 is a view according to FIG. 6 with the securements shown in the position of rest.

FIGS. 6 and 7 schematically show a second embodiment of the device 10 of the present invention. Securements 5 and 6 are respectively comprised of sets of elements with the respective elements of each set being pivotally connected one with the other via linking articulations and connected to the support member 4 at stationary locations by articulations, the same as in the first embodiment of FIGS. 4 and 5. Except as noted hereinafter, the same reference symbols used in the description of the first embodiment with reference to FIGS. 4 and 5 apply to the second embodiment of FIGS. 6 and 7 but for the sake of brevity most reference symbols are omitted from FIGS. 6 and 7. The differences of the second embodiment from the first embodiment is that in the second embodiment the securements 5 and 6 are also connected to the support member 4 at stationary locations by articulations 5g and 6g and thus no slide elements nor stops are utilized, and a driving means 9 in the form of a push-pull member 13, such as a double acting cable line or rod, is provided which extends between and pivotally connects with the element 5c of securement 5 and an extension 6h of element 6c of securement 6. The swivelling of the securements 5, 6 takes place such that the sets of elements of the securements are swivelled like parallelograms. In order for the swivel motion of the one securement 5, 6 to be transmitted to the other securement 6, 5, both are connected with one another via the push/pull member 13 of the driving means 9. Since the push/pull member 13 connects with the element 5c of securement 5 and with the extension 6h of element 6c of securement 6 which extends beyond the articulation 6g, the symmetric swivelling of the securements 5, 6 toward one another and the seat center is possible. The push/pull member 13 could also be extended, for example, beyond the securement 5 and the side contour 7a so that a comfortable handling of the swivelling of the securements 5, 6 could be carried out from one side of seat 1. If the articulation points of the push/pull member 13 on element 5c of securement 5 and on extension 6h of element 6c of securement 6 are disposed in the proximity of articulations 5g and 6g, the securements 5, 6 can be completely swivelled in and out with only a slight movement of the push/pull member 13.

Figure 8:
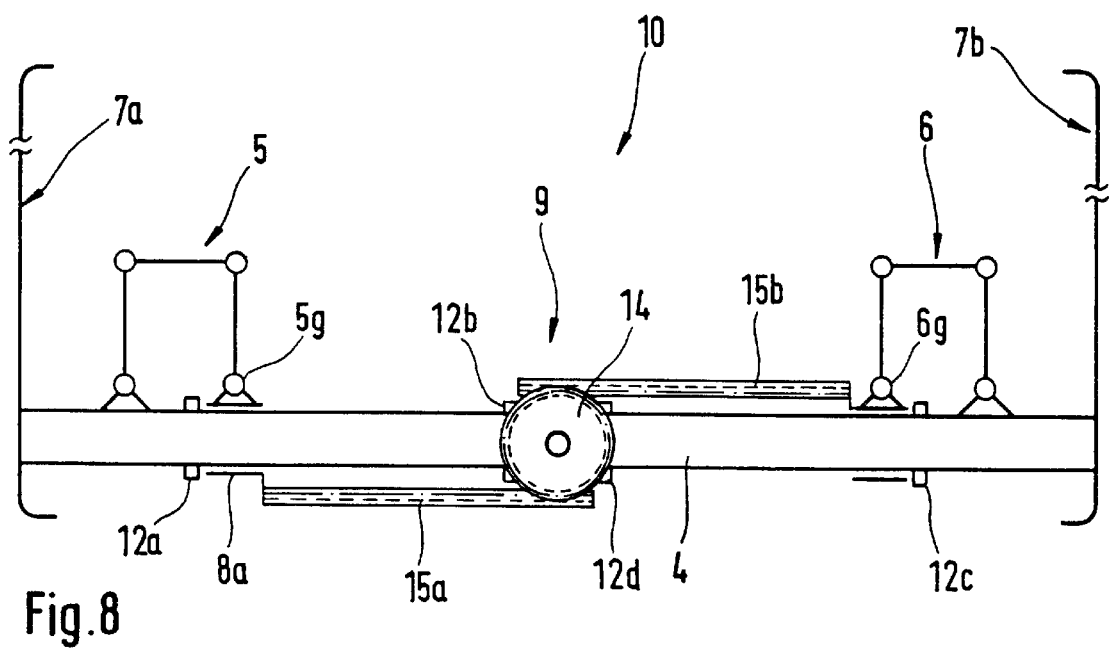
FIG. 8 is a schematic top view of a third embodiment of the device with the securements shown in the position of use.
Figure 9:
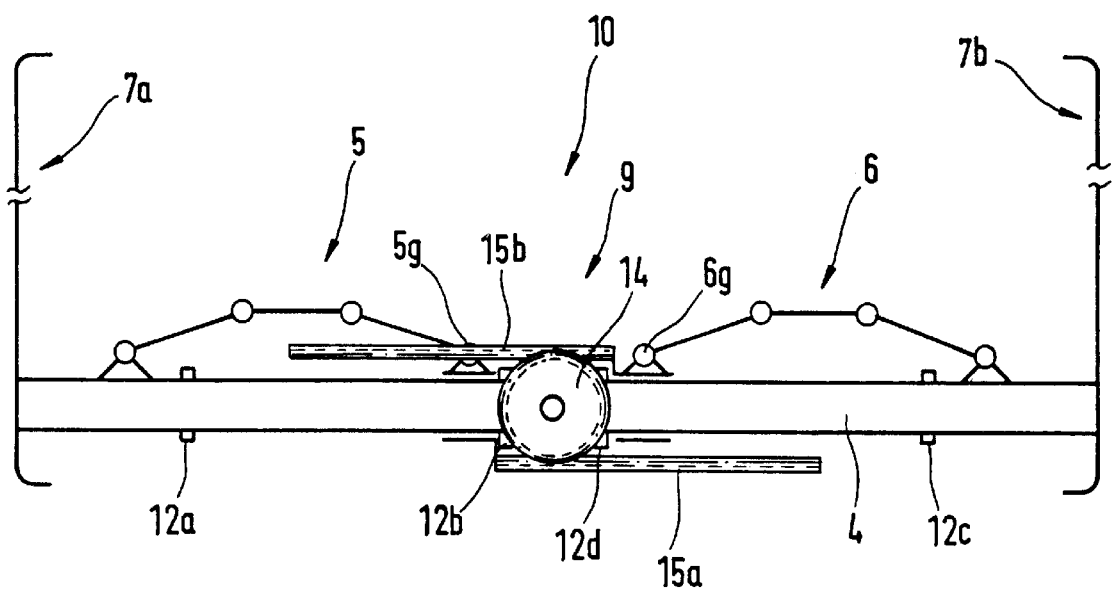
FIG. 9 is a view according to FIG. 8 with the securements show in the position of rest.

FIGS. 8 and 9 schematically show a third embodiment of the device 10 of the present invention which is identical to the first embodiment of FIGS. 4 and 5 in that the securements 5, 6 are the same and the same slide elements and stops are utilized. Thus, the same reference symbols used in the description of the first embodiment with reference to FIGS. 4 and 5 apply to the third embodiment of FIGS. 8 and 9 but for the sake of brevity most reference symbols are omitted from FIGS. 8 and 9. However, in the third embodiment the simultaneous actuation of the securements 5, 6 takes place by means of a driving means 9 in the form of a toothed wheel 14 and two toothed racks 15a, 15b. The toothed wheel 14 is supported, for example, on the support member 4. The toothed racks 15a, 15b engaged the toothed wheel 14 and are simultaneously connected with respective ones of the slide elements 8a, 8b. Depending on the direction of rotation of the toothed wheel 14, the racks 15a, 15b move either toward or away from one another. As an alternative to the embodiment shown in FIGS. 8 and 9, the toothed wheel/rack embodiment can also be disposed in the interior of the hollow support member 4. This solution can again be combined with inner or outer slide elements 8a, 8b. An operating element for driving the toothed wheel 14 can be disposed in this configuration comfortably on the backside of the motor vehicle seat 1.

It is thought that the present invention and its advantages will be understood from the foregoing description and it will be apparent that various changes may be made without departing from the spirit and scope of the invention or sacrificing all of its material advantages, the forms hereinbefore described being merely preferred or exemplary embodiments thereof.

I claim:

1. A device for detachably securing an object on a motor vehicle seat, comprising:
    (a) a transverse support member mountable adjacent to and along a gap between a seating surface and backrest of a seat of a motor vehicle; and
    (b) a pair of securements spaced apart and mounted to said support member-so as to extend into the gap and being adapted for securing an object on the seating surface, each of said securements including a set of elements, each set of elements including a pair of opposite shanks, means for movably mounting said shanks to said support member, a middle web extending between said opposite shanks and a pair of articulations movably connecting said shanks with said middle web such that said opposite shanks extend generally parallel to one another and said middle web extends generally perpendicular to said shanks when said securement is in a position of use and further such that said shanks and said middle web of each set lie in a common plane and are swivellable in said plane relative to said support member between said position of use in which said set of elements of each securement is extended away from said support member and the gap and a position of rest in which said set of elements of each securement is retracted toward said support member and into the gap, said respective shanks and middle webs of said sets of elements of said securements in said positions of use forming respective U-shaped configurations such that one of said securements is substantially the same as and a mirror image of the other of said securements.

2. Device as claimed in claim 1, wherein said support member has an elongated tubular configuration.

3. Device as claimed in claim 1 wherein said connecting means of each of said securements includes another pair of articulations either directly or indirectly connecting said shanks to said support member.

4. Device as claimed in claim 3, wherein said articulations of said another pair thereof of each of said securements pivotally connects each of said shanks at stationary locations on said support member.

5. Device as claimed in claim 4, further comprising:
means interconnecting selected ones of said shanks of said securements for driving said securements so as to concurrently swivel between said positions of rest and positions of use.

6. Device as claimed in claim 5, wherein said driving means is a push/pull member extending between and connecting said selected ones of said shanks of said securements such that said securements have parallelogram configurations in said positions of rest.

7. Device as claimed in claim 3, wherein one of said articulations of said another pair thereof of each of said securements pivotally connects one of said shanks of each of said securements at a stationary location on said support member.

8. Device as claimed in claim 7, wherein said connecting means of each of said securements further includes a slide element mounted to undergo sliding movement along said support member and the other of said articulations of said another pair thereof of each of said securements pivotally connects the other of said shanks to said slide element.

9. Device as claimed in claim 8, further comprising:
means connecting to said slide elements associated with said securements for driving said slide elements and thereby said securements so as to concurrently swivel between said positions of rest and positions of use.

10. Device as claimed in claim 9, wherein said driving means is a toothed wheel and two toothed racks each connected to one of said slide elements and engaged with said toothed wheel so as to act oppositely with respect to one another upon rotation of said toothed wheel in either one of a pair of opposite directions to move said slide elements in opposite directions along said support member and swivel said securements between said positions of use and positions of rest such that said securements have arcuate configurations in said positions of rest.

11. Device as claimed in claim 8, wherein each of said slide elements is mounted exteriorly on said support member.

12. Device as claimed in claim 8, further comprising:
two pairs of stops stationarily mounted on said support member at axially spaced positions therealong, each pair of said stops associated with said slide element of one of said securements such that said slide element is located between and movable toward and away from said stops.

13. Device as claimed in claim 1, further comprising:
means for driving said securements so as to concurrently swivel between said positions of rest and positions of use.

14. Device as claimed in claim 13, wherein said driving means is a push/pull member extending between and connecting selected ones of said elements of said securements such that said securements have parallelogram configurations in said positions of rest.

15. Device as claimed in claim 13, wherein said driving means is a toothed wheel and two toothed racks engaged with said toothed wheel and which act oppositely with respect to one another upon rotation of said toothed wheel in either one of a pair of opposite directions to swivel said securements between said positions of use and positions of rest such that said securements have arcuate configurations in said positions of rest.

* * * * *